US012692835B2

(12) United States Patent
Chang

(10) Patent No.: US 12,692,835 B2
(45) Date of Patent: Jul. 28, 2026

(54) WIND POWER GENERATING APPARATUS

(71) Applicant: GLOBAL WIND & SOLAR POWER PTE. LTD., Singapore (SG)

(72) Inventor: Brian Chang, Singapore (SG)

(73) Assignee: GLOBAL WIND & SOLAR POWER PTE. LTD., Singapore (SG)

( * ) Notice: Subject to any disclaimer, the term of this patent is extended or adjusted under 35 U.S.C. 154(b) by 0 days.

(21) Appl. No.: 19/115,228

(22) PCT Filed: Apr. 19, 2024

(86) PCT No.: PCT/SG2024/050257
§ 371 (c)(1),
(2) Date: Mar. 25, 2025

(87) PCT Pub. No.: WO2024/248723
PCT Pub. Date: Dec. 5, 2024

(65) Prior Publication Data
US 2025/0327440 A1 Oct. 23, 2025

(30) Foreign Application Priority Data

May 30, 2023 (SG) ............................ 10202301519S

(51) Int. Cl.
*F03D 9/25* (2016.01)
*F03D 5/04* (2006.01)

(52) U.S. Cl.
CPC ................. *F03D 9/25* (2016.05); *F03D 5/04* (2013.01); *F05B 2220/706* (2013.01)

(58) Field of Classification Search
CPC ..... F03D 9/25; F03D 5/04; F03D 7/00; F05B 2220/706; F05B 2260/76; F05B 2270/32; F05B 2270/321
See application file for complete search history.

(56) References Cited

U.S. PATENT DOCUMENTS 8,192,140 B2 * 6/2012 Kelaiditis ................. F03D 5/02
416/189
8,362,631 B2 1/2013 Roe
(Continued)

FOREIGN PATENT DOCUMENTS

BR PI1104688 A2 8/2013
CN 202031768 U 11/2011
(Continued)

OTHER PUBLICATIONS

First Office Action dated May 23, 2025 for Chinese Application No. 202480003422.6.

(Continued)

*Primary Examiner* — Joseph Ortega

(74) *Attorney, Agent, or Firm* — JCIP; Joseph G. Chu

(57) ABSTRACT

A wind power generating apparatus (1) comprising: a rotatable track (3) rotatably mounted in an at least substantially horizontal plane; at least one power generator (7) associated with the rotatable track such that power from the power generator(s) is generated by rotation of the rotatable track; a plurality of elongate aerofoil modules (9) rotatably supported on the rotatable track, each of the aerofoil modules extending at least substantially laterally from the rotatable track, the rotation of each of the aerofoil modules about an elongate axis of the aerofoil module being independently controllable to thereby maximise. a motive force applied to the aerofoil modules.

15 Claims, 4 Drawing Sheets

(56)　　　　References Cited

U.S. PATENT DOCUMENTS

| | | |
|---|---|---|
| 2009/0169354 A1 | 7/2009 | Kelaiditis et al. |
| 2018/0065722 A1 | 3/2018 | Cattano |

FOREIGN PATENT DOCUMENTS

| | | |
|---|---|---|
| CN | 107250531 A | 10/2017 |
| CN | 108374752 A | 8/2018 |
| CN | 208310955 U | 1/2019 |
| CN | 114439679 A | 5/2022 |
| DE | 3332054 A1 | 3/1985 |
| KR | 101235683 B1 | 2/2013 |
| RU | 2005104946 A | 7/2005 |
| RU | 2319859 C2 | 3/2008 |
| WO | 2021184048 A1 | 9/2021 |

OTHER PUBLICATIONS

First Search Report dated May 21, 2025 for Chinese Application No. 202480003422.6.

Second Office Action dated Sep. 24, 2025 for Chinese Application No. 202480003422.6.

International Search Report and Written Opinion of PCT/SG2024/050257 with mailing date of Jun. 10, 2024.

Second Written Opinion of PCT/SG2024/050257 with mailing date Oct. 9, 2024.

International Preliminary Report on Patentability with completion date Dec. 23, 2024.

International Journal of Advanced Engineering Research and Science (IJAERS) vol. 3, Issue-4 , Apr. 2016, ISSN: 2349-6495, "Design and Analysis of Telescopic Boom for Mobile Cranes".

The Brazilian Society of Mechanical Sciences and Engineering 2016, J Braz. Soc. Mech. Sci. Eng., DOI 10.1007/s40430-016-0558-y, "Design and structural optimisation of a tractor mounted telescopic boom".

H. Dogus Akaydin, Science and Technology Corporation, NASA Ames Research Center, Moffett Field, CA, "Computational Design of a Krueger Flap Targeting Conventional Slat Performance".

Peter K.C. Rudolph, NASA Contractor Report 4746, "High-Lift Systems on Commercial Subsonic Airliners".

* cited by examiner

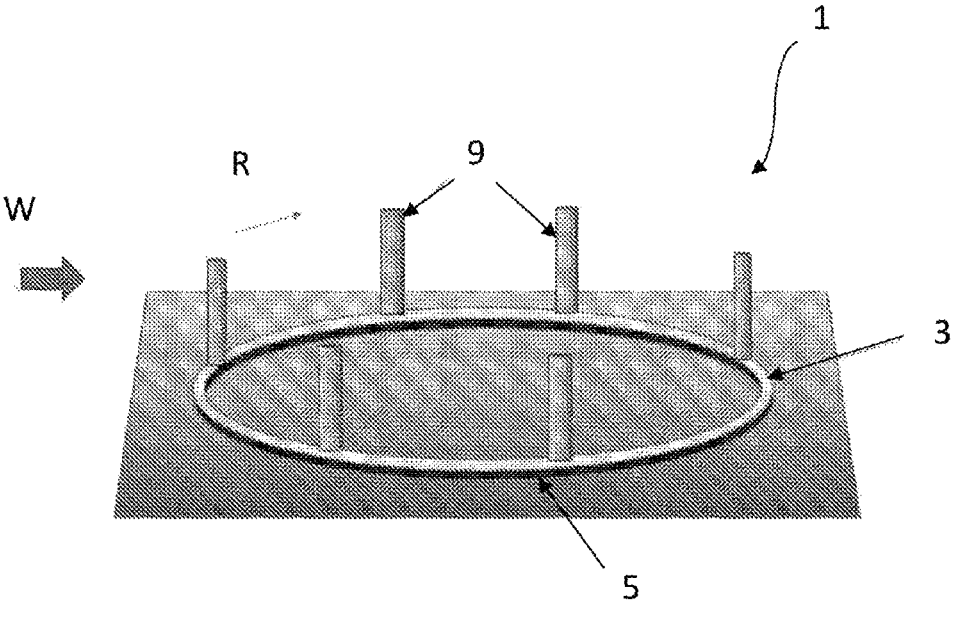
[Fig. 1]
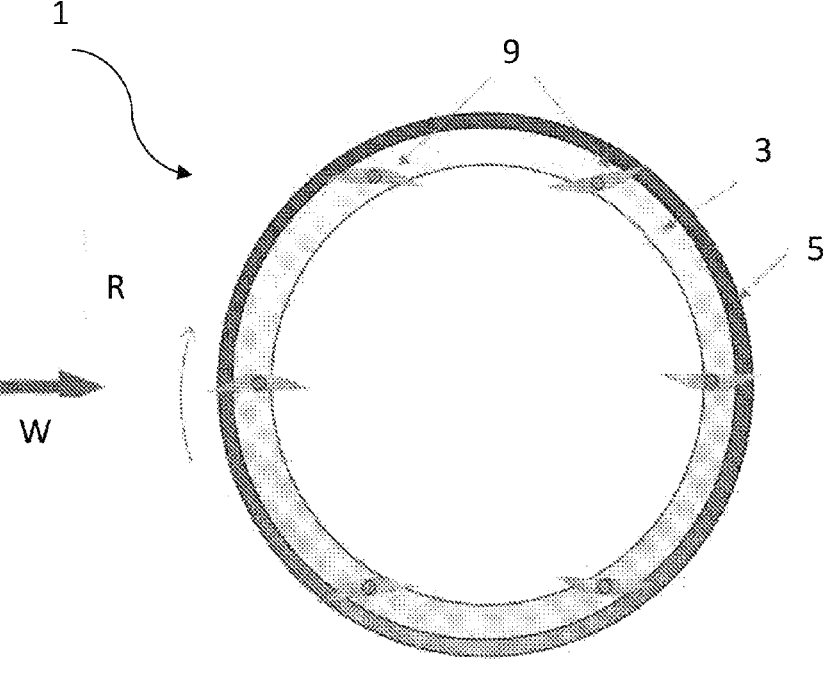
[Fig. 2]

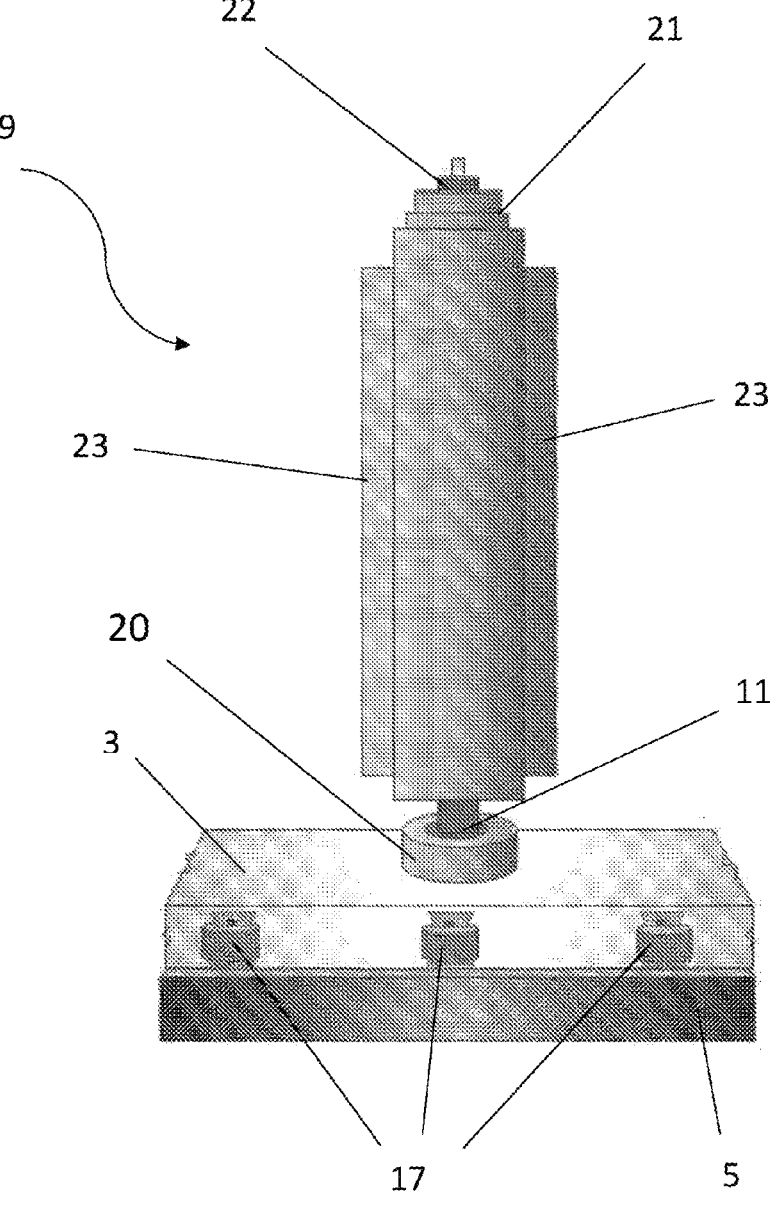
[Fig. 3]

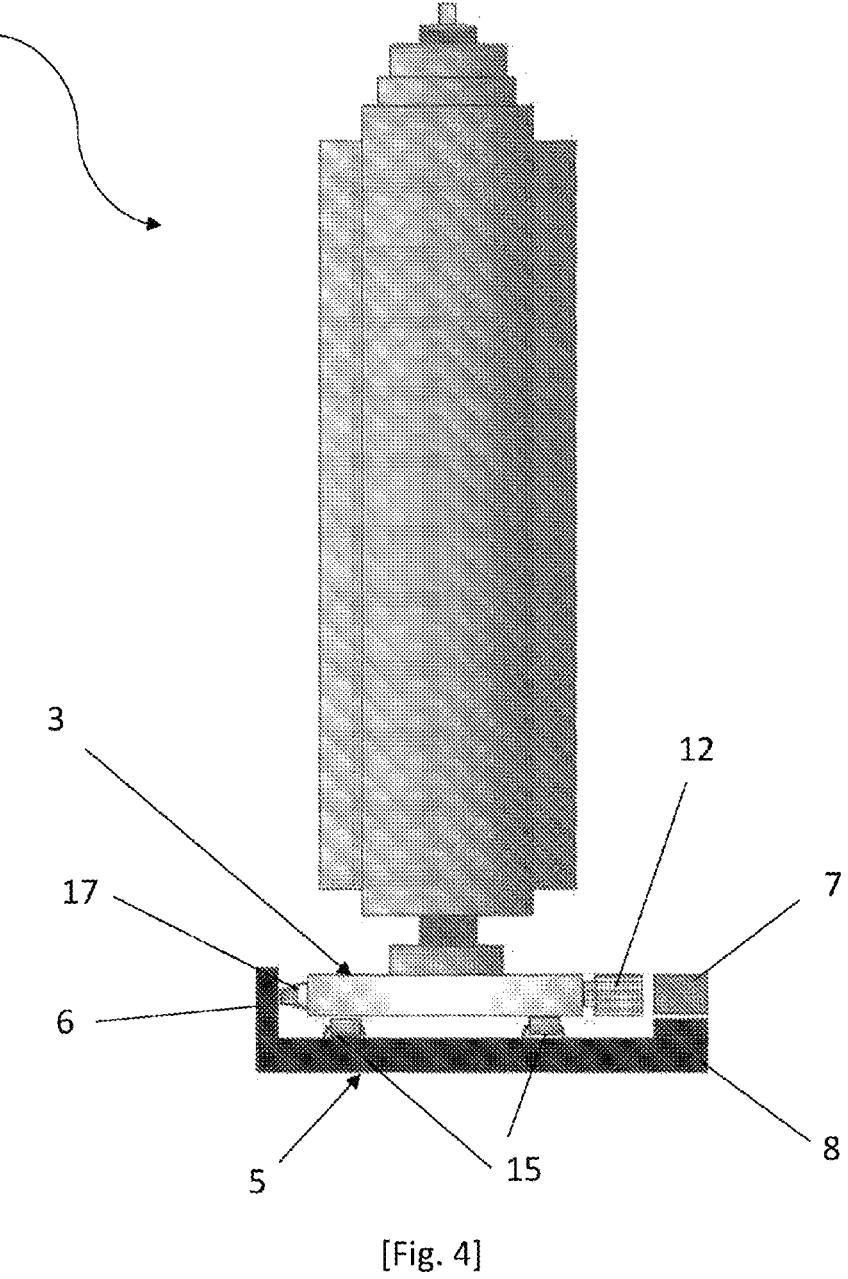
[Fig. 4]

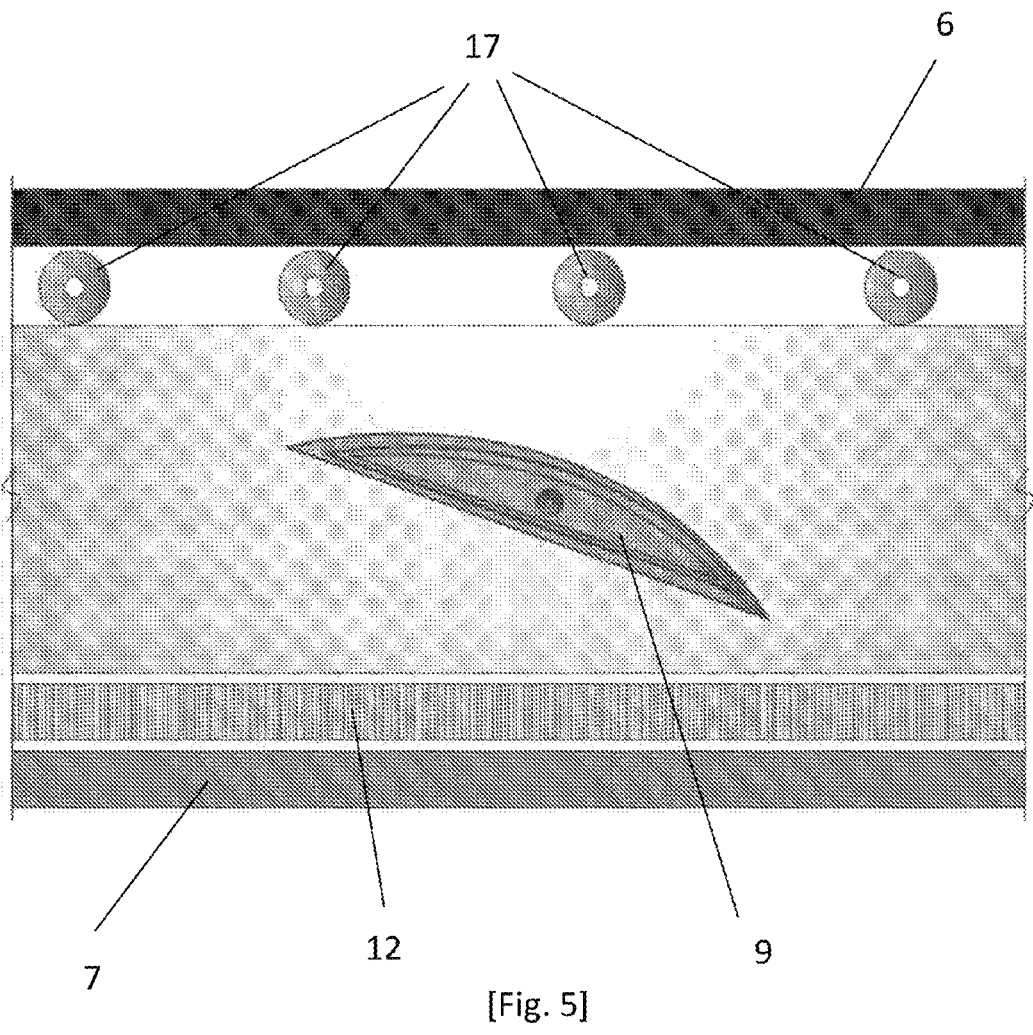
[Fig. 5]
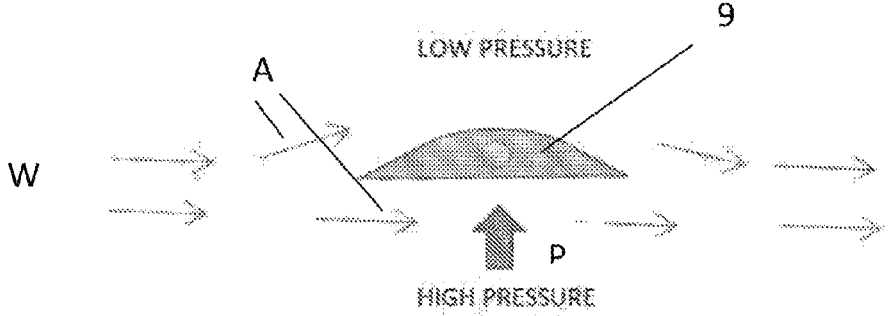
[Fig. 6]

1

WIND POWER GENERATING APPARATUS

FIELD

The present invention relates to a wind power generating apparatus for onshore and offshore installations.

BACKGROUND

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Power generating windmills are now widely used as an alternative energy source for generating electrical power. Such power generating windmills typically have a vertical mast at the top of which is supported a power generator connected to a propeller assembly. These Horizontal Axis Wind Turbines and allow for power to be generated as the propeller assembly is rotated by the motive force applied to the propeller assembly by prevailing winds at the location of the windmill. Newer power generating windmills can generate up to 20 megawatts of power and may be around 300 m in height and weight around 130 tonnes. There are immense challenges and costs in transporting the large horizontal axis wind turbines. The blades cannot be folded or bent once manufactured. There are limited routes trucks can take due to radius of turns. Large towers or masts may not fit under bridges or highway over passes. More than any other, this limits the size of conventional wind turbines.

Windmill farms incorporating a number of windmills have been installed in land locations that are relatively unpopulated and having the necessary land area to accommodate the windmill farm. It is however not always possible to install windmill farms at onshore locations, due to the limited availability of land within the country, or not having any appropriate land sites sufficiently close to populated areas within that country. Therefore, windmill farms have been installed in offshore locations for this reason. Offshore installations can however be relatively expensive to install because each windmill needs to be separately supported on an appropriately sized floating or fixed platform anchored to the seafloor. Furthermore, this can limit the size of the windmill that can be installed on the floating or fixed platform. This can prevent any upscaling of the windmill to increase the power output as this will require the windmill to be larger in size. It may therefore be unfeasible or impractical to support an upscaled windmill on an existing floating or fixed platform. The cost for providing a floating or fixed platform that can support such an upscaled windmill can however be prohibitively high or unfeasible in practice. This can limit the maximum power that can be generated in an offshore installation.

Another disadvantage associated with the use of conventional windmills is the high costs for fabricating and maintaining conventional windmills because of the need for high cost material and specialised manufacturing facilities to produce the components of the windmill, and in particular the propellor blades of the windmill. This can result in an older windmill installation becoming unfeasible or not economically viable to maintain thereby requiring the complete replacement of the windmills.

An object of the invention is to ameliorate one or more of the above-mentioned difficulties.

SUMMARY

According to an aspect of the present disclosure, there is provided a wind power generating apparatus comprising:

a rotatable track rotatably mounted in an at least substantially horizontal plane;

at least one power generator associated with the rotatable track such that power from the power generator(s) is generated by rotation of the rotatable track;

a plurality of elongate aerofoil modules rotatably supported on the rotatable track, each of the aerofoil modules extending at least substantially laterally from the rotatable track, an angular position of each of the aerofoil modules about an elongate axis of the aerofoil module being independently controllable to thereby maximise. a motive force applied to the aerofoil modules.

In some embodiments, each aerofoil module further comprises a sensor for detecting wind speed and direction, and a control mechanism for adjusting the angular position of the aerofoil module, the sensor being adapted to send the wind speed and direction signals to the control mechanism.

In some embodiments, the sensor is located at an upper end of the aerofoil module, and the control mechanism is located around a shaft supporting the aerofoil module on the rotatable track.

In some embodiments, the aerofoil module comprises a plurality of telescopic sections to allow for the aerofoil modules to be extendible in height.

In some embodiments, the aerofoil modules include at least one extendible side portion located on a side of the aerofoil module to allow the aerofoil module to be extendible in width.

In some embodiments, the extendible side portions are located on both sides of the aerofoil module.

In some embodiments, the generator comprises at least one linear generator located on the supporting track and adjacent an edge of the rotatable track, and at least one magnet supported on the rotatable track.

In some embodiments, the rotatable track is supported on the supporting track by a plurality of roller bearings.

In some embodiments, the supporting track comprises an inner peripheral lip upon which is supported the at least one linear generator, and an outer peripheral lip, with a plurality of roller bearings being provided between the rotatable track and the outer peripheral lip.

In some embodiments, the generator is a rotary generator.

In some embodiments, the supporting track is installable on a floating or fixed platform.

Other aspects and features will become apparent to those of ordinary skill in the art upon review of the following description of specific embodiments in conjunction with the accompanying figures.

BRIEF DESCRIPTION OF THE DRAWINGS

In the figures, which illustrate, by way of example only, an embodiment of the present invention, FIG. 1 is a plan view of an embodiment of a wind power generating apparatus according to the present disclosure;

FIG. 2 is an elevation view of the wind power generating apparatus of FIG. 1;

FIG. 3 is a detailed elevation view of an aerofoil module, rotatable track and supporting track of the wind power generating apparatus of FIG. 1;

FIG. 4 is a detailed cross-sectional view of the aerofoil module, rotatable track and supporting track of FIG. 3;

FIG. 5 is a detailed plan view of the aerofoil module, rotatable track and supporting track of FIG. 3; and FIG. 6 is a schematic plan view of the aerofoil module of the power generating apparatus according to the present disclosure showing the motive force applied thereto during operation.

Other arrangements of the invention are possible and, consequently, the accompanying drawings are not to be understood as superseding the generality of the preceding description of the invention.

DETAILED DESCRIPTION

Throughout this document, unless otherwise indicated to the contrary, the terms "comprising", "consisting of", "having" and the like, are to be construed as non-exhaustive, or in other words, as meaning "including, but not limited to".

Furthermore, throughout the specification, unless the context requires otherwise, the word "include" or variations such as "includes" or "including" will be understood to imply the inclusion of a stated integer or group of integers but not the exclusion of any other integer or group of integers.

Example embodiments of the present invention will now be described with reference to the accompanying drawings. The terminology used herein is for the purpose of describing particular embodiments only and is not intended to limit the scope of the present invention. Other definitions for selected terms used herein may be found within the detailed description of the invention and apply throughout the description. Additionally, unless defined otherwise, all technical and scientific terms used herein have the same meanings as commonly understood by one or ordinary skill in the art to which this invention belongs. Where possible, the same reference numerals are used throughout the figures for clarity and consistency.

FIGS. 1 to 6 show an embodiment of a wind power generating apparatus 1 according to the present disclosure. The wind power generating apparatus 1 is in the form of a windmill for capturing energy from the prevailing winds at onshore and offshore locations. That wind power generating apparatus 1 captures the motive force provided by air movement due to the prevailing winds at an installation location of the power generating apparatus 1. The installation location can for example be on high ground on a hill, that is unobstructed by buildings and trees. Alternatively, the installation may be in an offshore location on a floating platform such as a barge that is moored to the seabed. The apparatus 1 comprises a rotatable track 3 in the form of an annular ring supported and rotatably mounted on a supporting track 5 in an at least substantially horizontal plane. At least one power generator 7, which may be in the form of a linear generator, is associated with the rotatable track 3 such that power from the power generator(s) 7 is generated by rotation R of the rotatable track 3 relative to the power generator(s) 7. The apparatus 1 further comprises a plurality of elongate aerofoil modules 9 rotatably supported in a spaced apart arrangement along the rotatable track 3, each of the aerofoil modules 9 extending at least substantially laterally from the rotatable track 3.

The aerofoil modules 9, when used in the described embodiment, respectively act as 'aerofoils' for capturing energy from the prevailing winds at the installation location. Each aerofoil module 9 is pivotally supported on an axle 11 that extends generally laterally from the rotatable track 3. This enables each aerofoil module 9 to be rotatable about an elongate axis of the aerofoil module 9 that extends co-axially through the axle 11. The rotatable track 3 is itself supported on a supporting track 5, with bearings 15, which may be in the form of roller bearings, being provided between the rotatable track 3 and the supporting track 5 to allow for rotation of the rotatable track 3 in a rotational direction R relative to the supporting track 5 as shown in FIGS. 1 and 2. Side bearings 17 may also be provided between an outer edge of the rotatable track 3 and an outer peripheral lip 6 of the supporting track 5. The generator 7 can be located on an inner peripheral lip 8 of the supporting track 5 as shown in FIG. 4. A series of magnets 12 may be supported on the rotatable track 3, each magnet 12 interacting with the wire coils of the or each linear generator 7. This allows for power to be generated by the rotational displacement of the rotatable track 3 relative to the generator 7. It is alternatively envisaged that the generator be in the form of a rotary generator that generates power from the rotational displacement of the rotatable track.

Each aerofoil module 9 is independently rotatable about the elongate axis of the aerofoil module 9 mounted on the rotatable track 3. The aerofoil modules 9 can be respectively rotated relative to the rotatable track 3 to thereby maximise the motive force applied to the aerofoil modules 9. The angular position of each aerofoil module 9 relative to the rotatable track 3 can be controlled to take into account the direction W of the prevailing wind relative to the aerofoil module 9. FIG. 2 shows in more detail the instantaneous position of each of the aerofoil modules 9 on the rotatable track 3 when the wind prevailing direction W is from left to right as shown in FIG. 2. The number of aerofoil modules 9 installed on the rotatable track 3 can be predetermined according to site conditions and the size of the wind power generating apparatus 1.

FIGS. 3 and 4 show in more detail the features of the aerofoil module 9, rotatable track 3, and supporting track 5 of the wind power generating apparatus 1 according to the present disclosure. Each aerofoil module 9 may be formed from a number of telescopic sections 21 and may therefore be extendible in height. Each aerofoil module 9 may further have extendible edge portions 23 extending from at least one side, or from each side thereof. This allows the aerofoil module 9 to also be extendible in width. The extension of the aerofoil module 9 in height and/or width acts to vary the amount of the motive force applied to the aerofoil module 9 by the prevailing winds. Each aerofoil module 9 may be provided with sensors 22 to detect the wind speed and direction, which may be positioned at the top of each aerofoil module 9. Each sensor 22 can send a signal to relay this wind information to an intelligent control mechanism 20. The control mechanism 20 can be located around the aerofoil module shaft 11 and can control the rotational position (i.e., the 'angle') of the aerofoil module 9. The rotational position of each aerofoil module 9 may be adjusted instantaneously in response to variations in the wind speed and direction. Furthermore, the control mechanism 20 may also control the extension and retraction of the height and width of the aerofoil module 9 depending on factors such as wind speed, and the speed of rotation of the rotatable track 3.

FIG. 6 illustrates the manner in which the wind can apply a motive force P on an aerofoil module 9. The wind direction W is from left to right as shown on the page. The airflow A across the aerofoil module 9 produces a low-pressure region 'above' the aerofoil module 9, and a high pressure region 'below' the aerofoil module 9 relative to the orientation of the aerofoil module 9 as shown in FIG. 6. This results in the direction of increased pressure shown by arrow P on the aerofoil module 9.

The wind power generating apparatus 1 according to the present disclosure has several advantages over conventional windmill designs in only requiring commonly available low-cost material such as mild steel to fabricate, thereby leading to lower initial capital costs. This then facilitates onsite maintenance of the wind power generating apparatus 1 as no special materials or equipment is required for this maintenance. Furthermore, as the wind power generating apparatus 1 is relatively compact in height and size compared with conventional windmills, they can be readily upscaled as required to increase the power output without any significant changes to the supporting floating platform when located at an offshore location.

It should be appreciated by the person skilled in the art that the above invention is not limited to the embodiment described. It is to be appreciated that modifications and improvements may be made without departing from the scope of the present invention.

It should be further appreciated by the person skilled in the art that one or more of the above modifications or improvements, not being mutually exclusive, may be further combined to form yet further embodiments of the present invention.

The invention claimed is:

1. A wind power generating apparatus comprising:
   a rotatable track rotatably mounted in an at least substantially horizontal plane;
   a supporting tracking supporting the rotatable track;
   at least one power generator associated with the rotatable track such that power from the power generator(s) is generated by rotation of the rotatable track;
   a plurality of elongate aerofoil modules rotatably supported on the rotatable track, each of the aerofoil modules extending at least substantially laterally from the rotatable track, an angular position of each of the aerofoil modules about an elongate axis of the aerofoil module being independently controllable to thereby maximize a motive force applied to the aerofoil modules;
   each said aerofoil module comprising a plurality of telescopic sections to allow for an extension and retraction in height of the aerofoil module; and at least one extendible side portion located on a side of the aerofoil module to allow an extension and retraction in width of the aerofoil module;
   wherein the extension and retraction of the height and width of the aerofoil module is controllable depending on factors including wind speed and the speed of rotation of the rotatable track.

2. The wind power generating apparatus according to claim 1, wherein each aerofoil module further comprises a sensor for detecting wind speed and direction, and a control mechanism for adjusting the angular position of the aerofoil module and the extension and retraction of the height and width of the aerofoil module, the sensor being adapted to send a wind speed and direction signals to the control mechanism.

3. The wind power generating apparatus according to claim 2, wherein the sensor is located at an upper end of the aerofoil module, and the control mechanism is located around a shaft supporting the aerofoil module on the rotatable track.

4. The wind power generating apparatus according to claim 2, wherein the control mechanism instantaneously adjusts the angular position of the aerofoil module in response to variations in the wind speed and direction.

5. The wind power generating apparatus according to claim 1, wherein the extendible side portions are located on both sides of the aerofoil module.

6. The wind power generating apparatus according to claim 1, wherein the generator comprises at least one linear generator located on the supporting track and adjacent an edge of the rotatable track, and at least one magnet supported on the rotatable track.

7. The wind power generating apparatus according to claim 6, wherein the rotatable track is supported on the supporting track by a plurality of roller bearings.

8. The wind power generating apparatus according to claim 7, wherein the supporting track comprises an inner peripheral lip upon which is supported the at least one linear generator, and an outer peripheral lip, with the plurality of roller bearings being provided between the rotatable track and the outer peripheral lip.

9. The wind power generating apparatus according to claim 1, wherein the generator comprises a rotary generator.

10. The wind power generating apparatus according to claim 1, wherein the supporting track is installable on a floating or fixed platform.

11. The wind power generating apparatus according to claim 1, wherein the plurality of telescopic sections comprises a series of sheathed telescopic sections, and wherein telescopic sections that are distal to the rotatable track are sheathable within adjacent telescopic sections that are more proximal to the rotatable track.

12. The wind power generating apparatus according to claim 1, wherein each aerofoil module comprises a cross-sectional shape with a substantially planar side and an opposing curved side, the sides joined by a leading end and a trailing end, wherein the cross-sectional shape comprises a thickness that tapers from a central portion of the cross-sectional shape to the leading and trailing ends.

13. The wind power generating apparatus according to claim 12, wherein the thickness of the leading and trailing ends are the same.

14. The wind power generating apparatus according to claim 13, wherein the cross-sectional shape is symmetrical about a central plane.

15. The wind power generating apparatus according to claim 1, wherein each aerofoil module comprises a cambered airfoil with a sharp leading edge and a sharp trailing edge.

* * * * *